US009780842B2

(12) United States Patent
Boudreau et al.

(10) Patent No.: US 9,780,842 B2
(45) Date of Patent: Oct. 3, 2017

(54) MOBILE DEVICE ASSISTED COORDINATED MULTIPOINT TRANSMISSION AND RECEPTION

(71) Applicants: Gary David Boudreau, Kanata (CA); Ron Casselman, Kanata (CA); Seyed Hossein Seyedmehdi, Metcalfe (CA)

(72) Inventors: Gary David Boudreau, Kanata (CA); Ron Casselman, Kanata (CA); Seyed Hossein Seyedmehdi, Metcalfe (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 75 days.

(21) Appl. No.: 13/723,841

(22) Filed: Dec. 21, 2012

(65) Prior Publication Data
US 2014/0177456 A1    Jun. 26, 2014

(51) Int. Cl.
| | | |
|---|---|---|
| H04B 7/02 | (2017.01) | |
| H04W 72/04 | (2009.01) | |
| H04B 7/15 | (2006.01) | |
| H04B 7/024 | (2017.01) | |
| H04B 7/155 | (2006.01) | |
| H04L 1/00 | (2006.01) | |
| H04B 7/026 | (2017.01) | |
| H04W 88/04 | (2009.01) | |
| H04L 5/00 | (2006.01) | |

(52) U.S. Cl.
CPC ............ *H04B 7/024* (2013.01); *H04B 7/026* (2013.01); *H04B 7/15592* (2013.01); *H04L 1/0003* (2013.01); *H04L 1/0009* (2013.01); *H04L 1/0077* (2013.01); *H04W 72/0406* (2013.01); *H04W 88/04* (2013.01); *H04L 5/0035* (2013.01)

(58) Field of Classification Search
CPC .... H04W 88/04; H04W 84/18; H04L 67/1072
USPC ................. 370/226, 242, 315, 316, 492, 501
See application file for complete search history.

(56) References Cited

U.S. PATENT DOCUMENTS

| | | | |
|---|---|---|---|
| 8,553,596 B1* | 10/2013 | Vivanco | ................. H04W 48/18 370/252 |
| 2007/0280172 A1 | 12/2007 | Tan et al. | |
| 2008/0219222 A1 | 9/2008 | Lo et al. | |
| 2010/0105404 A1 | 4/2010 | Palanki et al. | |
| 2010/0142466 A1 | 6/2010 | Palanki et al. | |
| 2010/0291940 A1 | 11/2010 | Koo et al. | |

(Continued)

FOREIGN PATENT DOCUMENTS

| | | | | |
|---|---|---|---|---|
| WO | 2011060589 A1 | 5/2011 | | |
| WO | WO2012/105167 A1 * | 8/2012 | ............ | H04W 28/16 |
| WO | 2012118311 A2 | 9/2012 | | |

*Primary Examiner* — Hoon J Chung
(74) *Attorney, Agent, or Firm* — Coats & Bennett, PLLC (57) ABSTRACT

Idle mobile devices are used as cooperating devices to support coordinated multipoint transmission and reception for uplink and downlink communications between a primary mobile device and its serving base station. For uplink communications, the cooperating mobile devices receive the uplink transmission from the primary mobile device and retransmit the received data signal to the serving base station for the primary mobile device. For downlink communications, the cooperating mobile devices receive the downlink transmission from the serving base station and retransmit the received data signal to the primary mobile device.

32 Claims, 10 Drawing Sheets

(56) References Cited

U.S. PATENT DOCUMENTS

| | | |
|---|---|---|
| 2011/0243191 A1* | 10/2011 | Nakao .................. H04J 11/0053 |
| | | 375/133 |
| 2011/0274188 A1 | 11/2011 | Sayana et al. |
| 2012/0113816 A1* | 5/2012 | Bhattad et al. ............... 370/246 |
| 2012/0170619 A1 | 7/2012 | Chang et al. |
| 2012/0282934 A1* | 11/2012 | Simonsson et al. .......... 455/446 |
| 2012/0282966 A1* | 11/2012 | Koo ...................... H04L 1/0026 |
| | | 455/517 |
| 2013/0157665 A1* | 6/2013 | Toda ..................... H04W 28/24 |
| | | 455/436 |

\* cited by examiner

MOBILE DEVICE ASSISTED COORDINATED MULTIPOINT TRANSMISSION AND RECEPTION

TECHNICAL FIELD

The present invention relates generally to coordinated multipoint (CoMP) transmission and reception in a wireless communication network and, more particularly, to methods and apparatus for implementing mobile device assisted CoMP transmission and reception in which mobile devices function as CoMP nodes for other mobile devices.

BACKGROUND

The phenomenal growth in demand for wireless communications has put persistent pressure on wireless network operators to improve the capacity of their communication networks. To improve the spectral efficiency of these networks, scarce radio resources have to be reused aggressively in neighboring cells. As a result, inter-cell interference has become a main source of signal disturbance, limiting not only the service quality to users at the cell edges, but also the overall system throughput.

Coordinated Multi-Point (CoMP) reception in the uplink is one technique being considered for mitigating inter-cell interference in International Mobile Telecommunications (IMT) Advanced systems. For the uplink (UL), CoMP reception differs from reception in a conventional system in that uplink signals are received at multiple, geographically dispersed base stations, and then sent across backhaul communication links to a common location for joint processing (e.g., to the serving base station). In effect, this architecture forms a "super-cell," called a CoMP cell, where uplink signals that would have been treated by a conventional cell as inter-cell interference are instead treated by the CoMP cell as desired signals. The mitigation in inter-cell interference is expected to significantly improve system performance, especially for users near the edge of a conventional cell.

Sending the received uplink signals across backhaul communication links for joint processing, however, can require significant and potentially prohibitive backhaul bandwidth. For many transmissions, the cooperating node is under a stringent time deadline to deliver the CoMP payload to the serving node for processing. For example, it is desirable that the uplink signals received by a cooperating node be processed and the CoMP payload delivered to the serving node within the time deadline for Hybrid Automatic Repeat Request (HARQ). In Long Term Evolution (LTE) systems, the HARQ timing is typically set to 4 ms, so that the HARQ process can assist in exploiting the short term behavior of the wireless channel. Usual solutions deliver the CoMP payload with a latency of less than 500 μs, which allows the payload to be useful to the serving cell within the HARQ deadline. The requirement for low latencies drives the peak data rates on the backhaul and requires very high bandwidth on the backhaul.

The synchronous nature of the cells also contributes to the high peak data rates. Because the transmission in all cells is synchronous, the CoMP payloads from many different nodes may be transmitted over the backhaul at the same time causing peak congestion. The average utilization of the links will be low, while the short peaks drive the bandwidth requirement and link costs.

Processing loads for processing the CoMP payloads is another area of concern. Solutions that minimize the processing load for CoMP operations are advantageous.

SUMMARY

The present invention takes advantage of the distributed nature of mobile devices and employs device-to-device (D2D) communications to enhance performance of both uplink and downlink CoMP in a wireless communication network.

In exemplary embodiments of the invention, idle mobile devices are used as cooperating devices to support coordinated multipoint transmission and reception for uplink and downlink communications between a mobile device and its serving base station. In addition to neighboring base stations, a mobile device can join a CoMP session. For uplink communications, the cooperating mobile devices receive the uplink transmission from the supported mobile device and retransmit the received data signal to the serving base station for the supported mobile device. For downlink communications, the cooperating mobile devices receive the downlink transmission from the serving base station and retransmit the received data signal to the supported mobile device.

Exemplary embodiments of the invention comprise methods implemented by a cooperating mobile device in a wireless communication network for supporting coordinated multipoint transmission and reception for a primary mobile device. In one exemplary method, the cooperating mobile device joins a coordinating set for the primary mobile device. The coordinating set includes a serving base station for the primary mobile device. While a member of the coordinating set, the cooperating mobile device receives a data signal transmitted from either the primary mobile device to the serving base station, or from the serving base station to the primary mobile device. The cooperating mobile device retransmits the data signal to either the serving base station for uplink communicators, or to the primary mobile device for downlink communications.

Other embodiments of the invention comprise a cooperating mobile device in a wireless communication network for supporting coordinated multipoint transmission and reception for a primary mobile device. The cooperating mobile device comprises a transceiver circuit configured to transmit and receive signals over a wireless communication channel, and a processing circuit including a coordinated multipoint control circuit. The processing circuit is configured to join a coordinating set for the primary mobile device. The coordinating set includes a serving base station for the primary mobile device. The processing circuit is configured to receive, as a member of the coordinating set for the primary mobile device, a data signal transmitted from either the primary mobile device to the serving base station, or from the serving base station to the primary mobile device. The processing circuit is further configured to retransmit, as a member of the coordinating set for the primary mobile device, the data signal to the serving base station for uplink communications, or to the primary mobile device for downlink communications.

Other embodiments of the invention comprise methods implemented by a serving base station in a wireless communication network for supporting coordinated multipoint reception for a primary mobile device. In one exemplary method, the serving base station receives a first data signal transmitted by the primary mobile device, and receives a second data signal as retransmitted by a cooperating mobile device in a coordinating set for the primary mobile device.

The second data signal comprises a retransmission of the first data signal. The serving base station further combines the first and second data signals to produce a combined data signal.

Other embodiments of the invention comprise a serving base station in a wireless communication network for supporting coordinated multipoint transmission and reception for a primary mobile device. The serving base station comprises a transceiver circuit configured to transmit and receive signals over a wireless communication channel, and a processing circuit including a coordinated multipoint control circuit. The processing circuit is configured to receive a first copy of a data signal transmitted by a primary mobile device, and to receive a second data signal as retransmitted by a cooperating mobile device in a coordinating set for the primary mobile device. The second data signal comprises a retransmission of the first data signal. The processing circuit is further configured to combine the first and second data signals to produce a combined data signal.

The present invention improves network capacity and throughput by taking advantage of the distributed nature of mobile devices and employing device-to-device (D2D) communications. In addition to improving capacity and throughput, the present invention improves interference coordination, and eliminates coverage holes for mobile devices in poor coverage areas. Using mobile devices as participants in a CoMP session can also reduce the bandwidth requirements for backhaul communications between neighboring base stations, as well as processing loads on the base stations.

DETAILED DESCRIPTION

Figure 1:
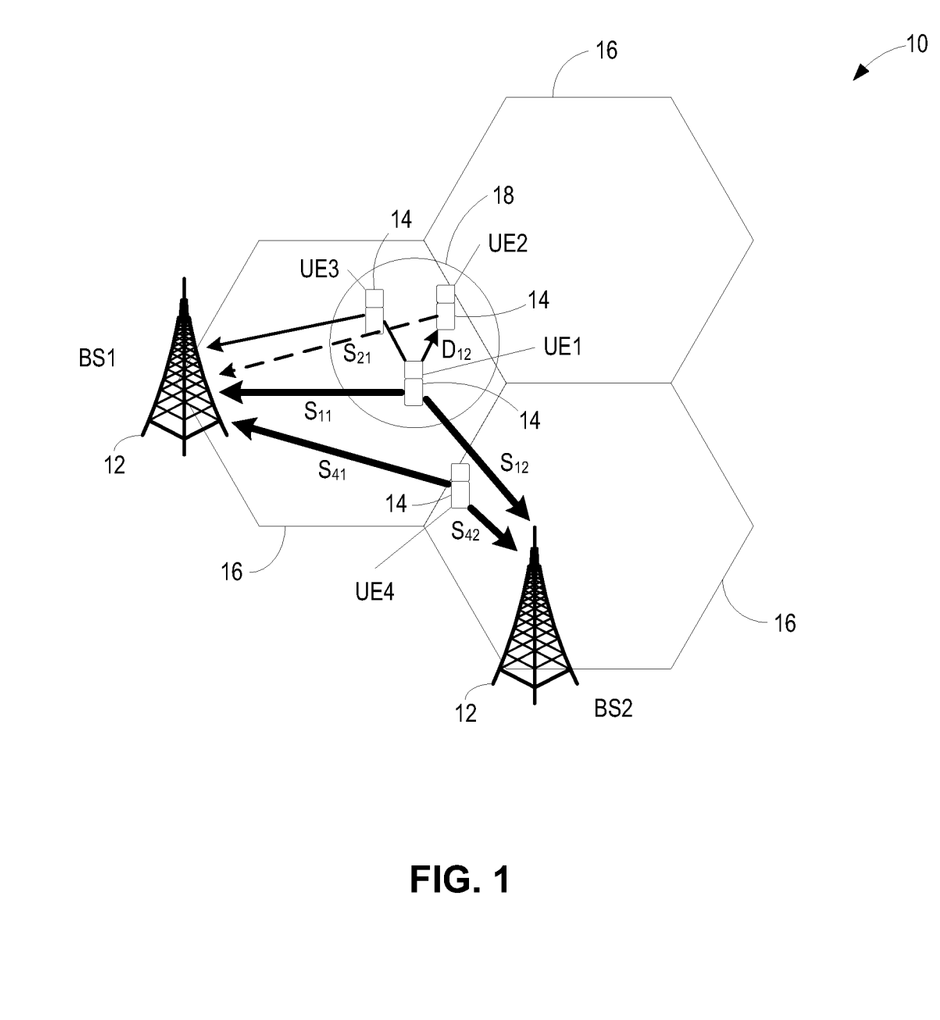
FIG. 1 illustrates a wireless communication network implementing mobile device assisted Coordinated Multipoint Reception (CoMP).

Referring now to the drawings, FIG. 1 illustrates a coordinated multipoint (CoMP) system 10 according to one exemplary embodiment of the invention. The CoMP system 10 comprises a plurality of geographically dispersed base stations 12 providing service to mobile devices 14 in respective cells 16 of the CoMP system 10. In FIG. 1, two base stations 12 and four mobile devices 14 are illustrated. In LTE, a base station is referred to as an Evolved Node B (eNodeB or eNB) and a mobile device is referred to as a user equipment (UE). The base stations 12 are denoted BS1 and BS2, respectively. The mobile devices 14 are denoted UE1, UE2, UE3 and UE4 respectively. BS1 is the serving base station 12 for UE1, UE2 and UE3, while BS2 is the serving base station 12 for UE4. The uplink signals from the mobile devices 14 to the base stations 12 are denoted as $s_{ij}$ where i indicates the mobile device 14 and j indicates the base station 12.

In a CoMP system 10, the uplink signals transmitted from the mobile devices 14 are typically received by multiple base stations 12 within a coordinating set, also referred to herein as a CoMP set. For purposes of this application, the term "coordinating base station 12" refers to any base station 12 in a coordinating set (i.e. the "CoMP set") that controls the CoMP session. The term "cooperating node" refers to either a base station 20 (i.e., cooperating base station 20) or mobile device 14 (cooperating mobile device 14) in the cooperating set. For a given mobile device 14, the coordinating set typically includes a coordinating or serving base station 12 and at least one other cooperating node, which may be a cooperating base station 12 or cooperating mobile device 14.

In the example shown in FIG. 1, the CoMP set for both UE1 and UE2 includes BS1 and BS2. BS1 receives uplink signals $s_{11}$ and $s_{41}$ from UE1 and UE4 respectively. BS1 may send the received signal $s_{41}$ over a backhaul link to BS2 for processing by BS2. BS2 receives uplink signals $s_{12}$ and $s_{42}$ from UE1 and UE4 respectively. BS2 may send the received signal $s_{12}$ over a backhaul ink to BS1 for processing by BS1.

UE1 is part of a local cluster 18 of mobile devices 14 that includes UE2 and UE3. UE3 is transmitting uplink signal $s_{31}$ to BS1. UE2 is idle. A mobile device 14 may be part or more than one local cluster 18.

In exemplary embodiments of the present invention, an idle mobile device 14 may help support uplink transmissions from a primary mobile device 14 to its serving base station 12 by selectively joining a CoMP set for a primary mobile device 14, and acting as a coordinating mobile device 14. The coordinating mobile device 14 may also support downlink transmissions from a serving base station to a primary mobile device 14. A mobile device 14 that joins a coordinating set for a primary mobile device 14 is referred to herein as a cooperating mobile device 14.

For uplink transmission from the primary mobile device 14 to the serving base station 12, a cooperating mobile device 14 receives signals transmitted by the primary mobile device 14, and retransmits the received signals to the serving base station 12 for the primary mobile device 12. The serving base station 12 may combine the signals received from the cooperating mobile device 14 with signals received from the primary mobile device 14 and/or other coordinating nodes for decoding. For downlink communications, a coordinating mobile device 14 receives a downlink transmission from the serving base station intended for the primary mobile device 14, and retransmits the received signal to the primary mobile device 14.

Figure 2:
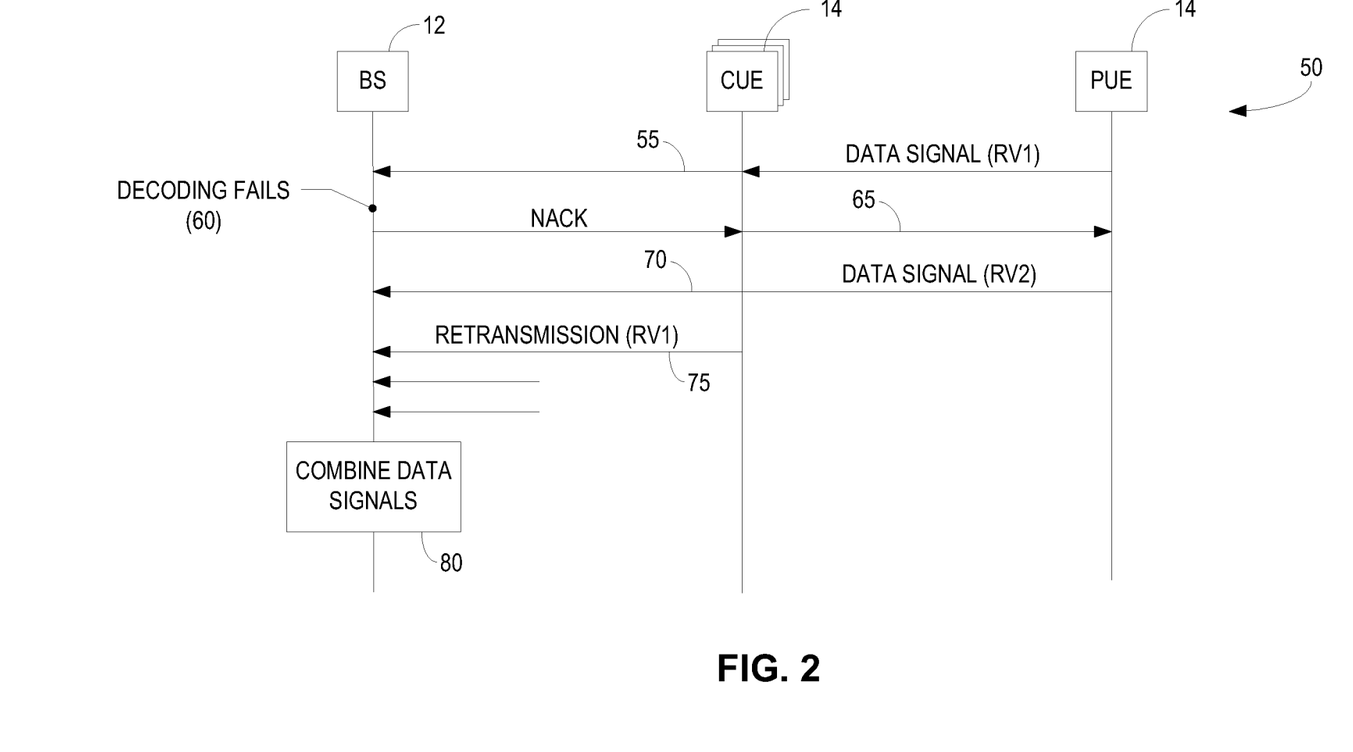
FIG. 2 is a flow diagram illustrating coordinated multipoint reception for uplink communications according to one embodiment.

In the example shown in FIG. 2, UE2, which is idle, may selectively join the CoMP set for UE1. As a cooperating mobile device 14, UE2 may receive signals transmitted on the uplink by UE1 and retransmit the received signals to BS1. The signal transmitted from UE1 to UE2 is denoted as $d_{12}$. The signal transmitted from UE2 to BS1 is denoted as $s_{21}$. It may be noted that the signals $d_{12}$ and $s_{21}$ contain the same information as the signal $s_{11}$ transmitted from UE1 to BS1. BS1 may use the received signal $s_{21}$ along with the signal $s_{12}$ obtained from BS2 to help decode the signal $s_{11}$. UE2 may also receive downlink transmissions from BS1 intended for UE1, and retransmit the received signals to UE1. UE1 may combine the retransmitted signal received from UE2 with the signal received from the serving base station for decoding.

FIG. 2 illustrates an exemplary method 50 of coordinated multipoint transmission and reception. In FIG. 2, a primary mobile device 14 (PUE) is transmitting an uplink signal to a serving base station 12. The uplink transmission is assisted by one or more coordinating mobile devices 14 (CUEs). The primary mobile device 14 transmits a data signal over an uplink channel to the serving base station 12 (55). The transmitted signal may be received by one or more cooperating mobile devices 14. In this example, the data signal comprises a first redundancy version (RV1) of an information signal and is transmitted in a first iteration of a HARQ process. The serving base station 12 attempts to decode the received data signal. It is assumed in this example that decoding of the data signal fails (60). Accordingly, the serving base station 12 sends a negative acknowledgement (NACK) to the primary mobile device 14 (65). The cooperating mobile devices 14 also monitor the ACK/NACK channel. In response to the NACK, the primary mobile device 14 transmits a second data signal to the serving base station 12 (70). The second data signal comprises a second redundancy version (RV2) of an information signal. Additionally, upon detection of the NACK, the cooperating mobile devices 14 retransmit the data signal received from the primary mobile device in the previous HARQ iteration (75). The serving base 12 combines the retransmitted data signals received from the cooperating mobile devices with the data signals received from the primary mobile device 14 (block 80). The combined data signals may be used for decoding the information signal transmitted by the primary mobile device 14.

Figure 3:
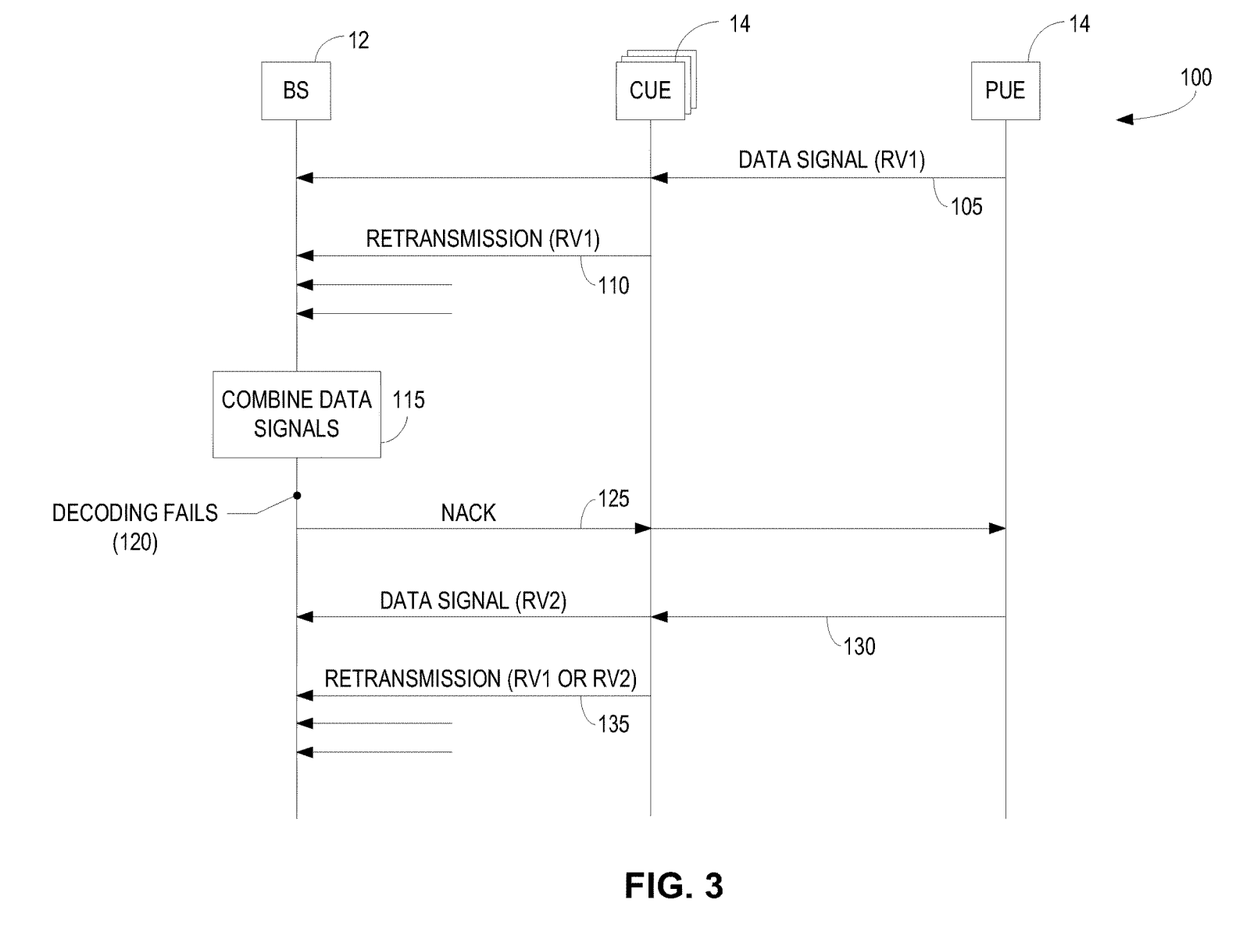
FIG. 3 is a flow diagram illustrating coordinated multipoint reception for uplink communications according to one embodiment.

FIG. 3 shows another exemplary method 100 of coordinated multipoint transmission and reception used to support uplink transmissions from a primary mobile device 14 to a serving base station 12. In this method 100, the primary mobile device 14 transmits a first redundancy version (RV1) of an information signal to the serving base station 12 (105). The signal RV1 is also received by one or more cooperating mobile devices 14. Upon receipt of the signal RV1, the cooperating mobile devices 14 immediately retransmit the signal RV1 to the serving base station 12 in the same HARQ iteration (110). The serving base station 12 combines the signals received from the cooperating mobile devices 14 and the primary mobile device 14 (115). It is assumed in this example that the decoding of the combined data signal fails (120). Accordingly, the serving base station 12 sends a NACK to the primary mobile device (125). The cooperating mobile devices 14 also monitor the ACK/NACK channel. Upon receipt of the NACK, the primary mobile device 14 transmits a second redundancy version of the information signal (RV2) to the serving base station in a second iteration of the HARQ process (130). Upon detection of the NACK, the cooperating mobile devices 14 may retransmit the first redundancy version RV1 of the information signal (135). Alternatively, the cooperating mobile devices 14 may receive and retransmit the second redundancy version (RV2) of the information signal.

Figure 4:
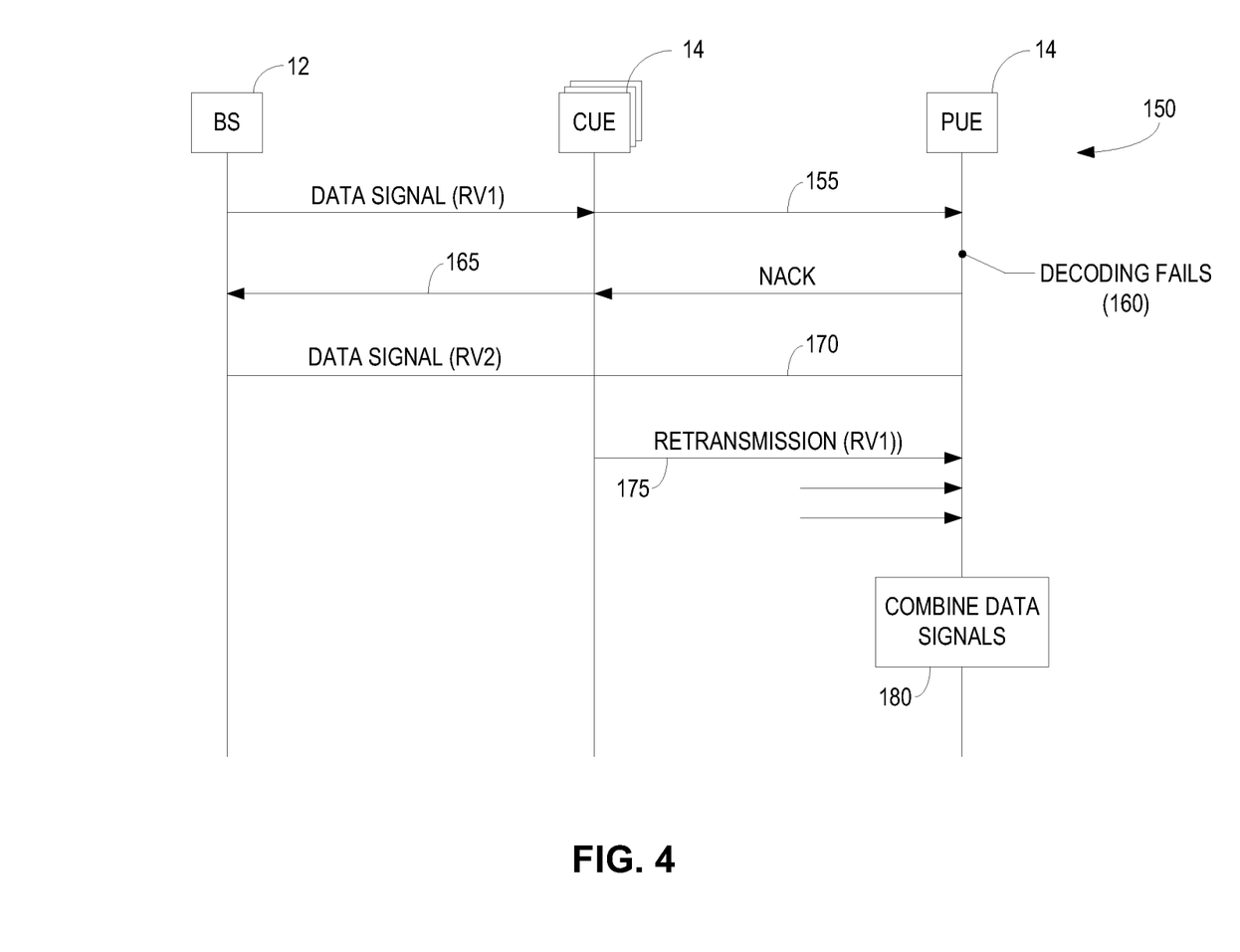
FIG. 4 is a flow diagram illustrating coordinated multipoint reception for downlink communications according to one embodiment.

FIG. 4 illustrates an exemplary method 150 according to another embodiment of the invention for supporting coordinated multipoint transmission and reception in downlink transmissions from a serving base station 12 to a primary mobile device 14. During a first HARQ iteration, the serving base station 12 sends a first redundancy version (RV1) of an information signal to the primary mobile device 14 over a downlink channel (155). The downlink transmission is also received by one or more cooperating mobile devices 14. It is assumed that the primary mobile device 14 fails to decode the signal received from the serving base station 12 (block 160). Accordingly, the primary mobile device 14 sends a NACK to the serving base station (165). The cooperating mobile devices 14 also monitor the ACK/NACK channel. Upon receipt of the NACK, the serving base station 12 sends a second redundancy version (RV2) of the information signal to the primary mobile device 14 (170). Upon detection of the NACK, the cooperating mobile devices 14 retransmit the first redundancy version (RV1) of the information signal to the primary mobile device (175). The primary mobile device 14 combines the signals received from the cooperating mobile devices 14 with the signals received from the serving base station 12 (180). The combined data signals may be used to decode the information signal.

Figure 5:
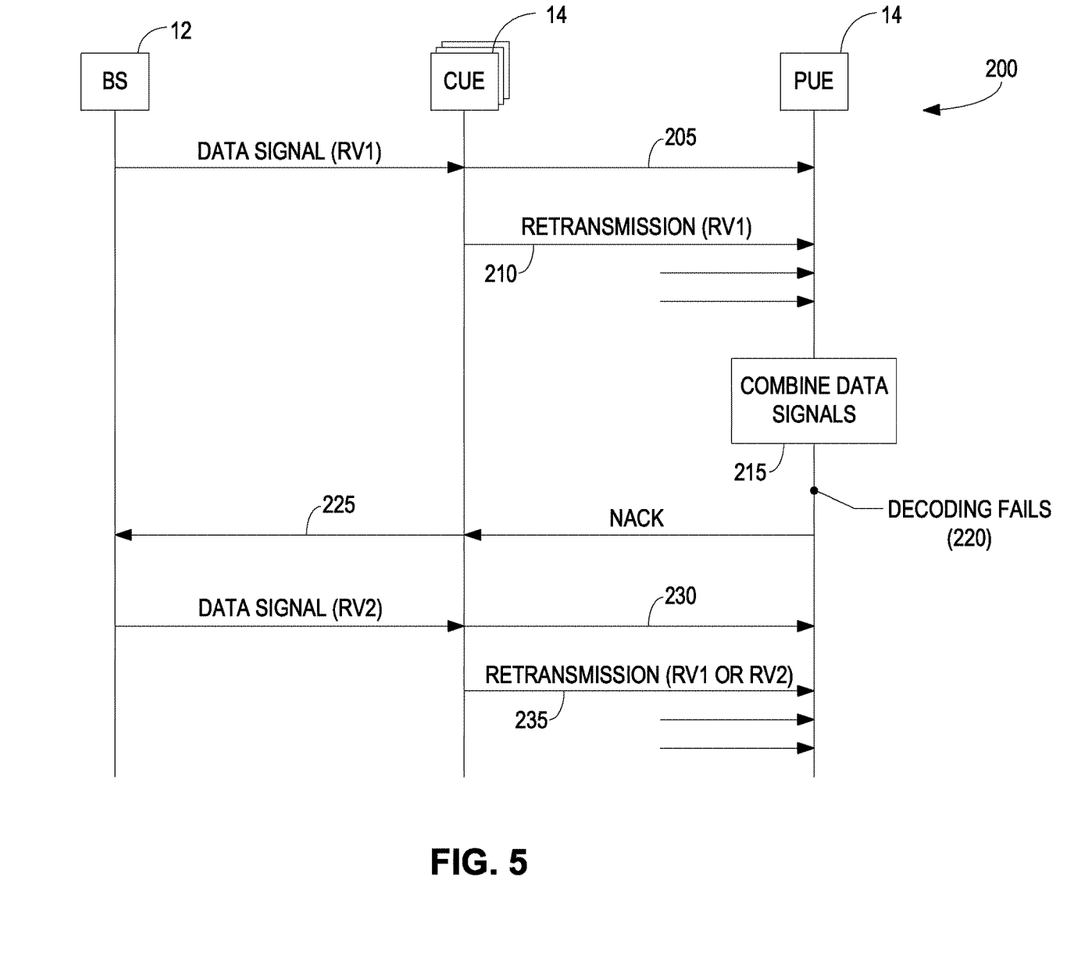
FIG. 5 is a flow diagram illustrating coordinated multipoint reception for downlink communications according to one embodiment.

FIG. 5 illustrates another exemplary method 200 of coordinated multipoint transmission and reception for supporting downlink transmissions from a serving base station 12 to a primary mobile device 14. During a first HARQ iteration, the serving base station 12 sends a first redundancy version (RV1) of an information signal to the primary mobile device 14. The downlink transmission is also received by one or more cooperating mobile devices 14. The cooperating mobile devices 14 immediately retransmit the signal RV1 to the primary mobile device 14 in the same HARQ iteration. The primary mobile device 14 combines the signals received from the cooperating mobile devices 14 with the signals received from the serving base station (block 215) and attempts to decode the information signal. It is assumed in this example that the decoding fails (block 220). The primary mobile device 14 sends a NACK to the serving base station 12 (block 225). The cooperating mobile devices 14 also monitor the ACK/NACK channel. Upon receipt of the NACK, the serving base station 12 sends a second redundancy version (RV2) of the information signal to the primary mobile device 14. The cooperating mobile devices 14, upon detection of the NACK, also retransmit the first redundancy version of the information signal to the primary mobile device 14 (block 235). Alternatively, the cooperating mobile devices 14 may receive and retransmit the second redundancy version (RV2) of the information signal.

Figure 6:
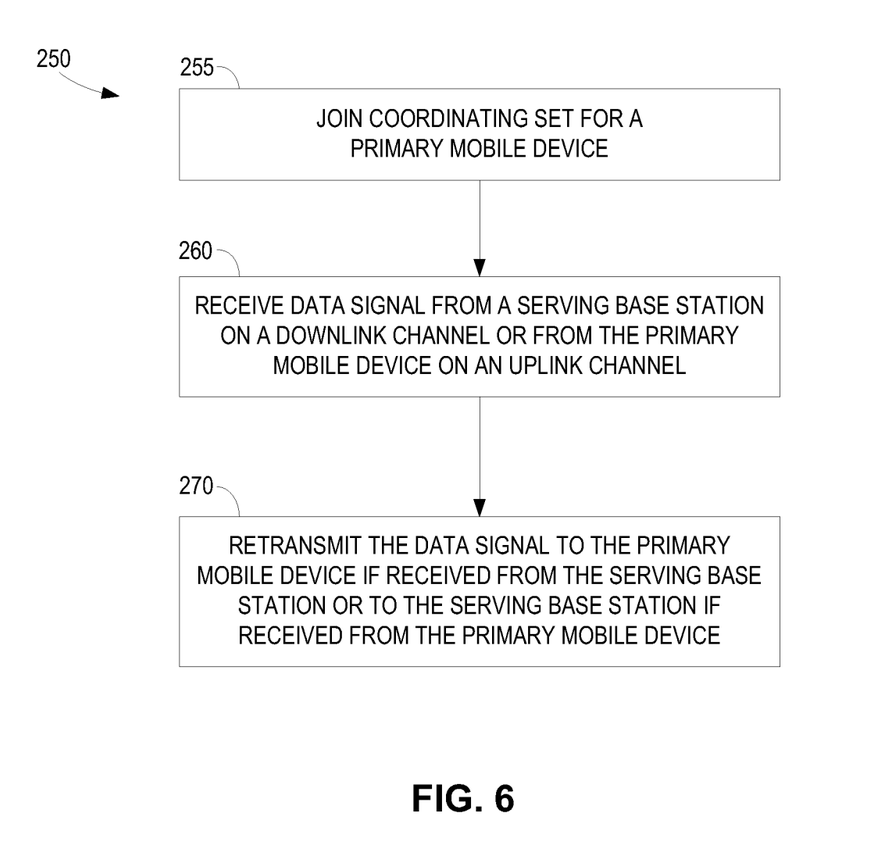
FIG. 6 illustrates an exemplary method implemented by a cooperating mobile device in a coordination set for supporting coordinated multipoint transmission and reception by a primary mobile device.

FIG. 6 illustrates an exemplary method 250 implemented in a cooperating mobile device 14 for supporting coordinated multipoint transmission and reception. The cooperating mobile device 14 joins a cooperating set for a primary mobile device 14 (block 255). The decision to join a cooperating set for a primary mobile device 14 may depend on a number of factors, including the link quality between the cooperating mobile device 14 and primary mobile device 14, and the link quality between the cooperating mobile device 14 and the serving base station 12. Other factors could also be taken into account. In some embodiments, the decision to join a coordinating set for a primary mobile device 14 may be made autonomously by the cooperating mobile device 14 based on a utility function. In other embodiments, the serving base station 12 for the primary mobile device 14 may request the cooperating mobile device 14 to join a coordinating set for the primary mobile device 14. Each of these approaches is described in greater detail below.

After joining the coordinating set for a primary mobile device 14, the cooperating mobile device 14 receives a data signal from the primary mobile device 14 on an uplink channel, or from the serving base station 12 on the downlink channel (block 260). In the case of a time division duplex (TDD) systems, no additional hardware is required for the cooperating mobile device 14. In frequency division duplex (FDD) systems, the cooperating mobile device 14 may need additional hardware to receive the transmissions to or from the primary mobile device 14. The cooperating mobile device 14 may retransmit the data signal to the primary mobile device 14 if received from the serving base station 12, or to the serving base station 12 if received from the primary mobile device 14 (block 270). The retransmission may involve a decode-and-forward operation. In this case, the cooperating mobile device 14 decodes the signal received from the serving base station 12 or primary mobile device 14, re-encodes the signal, and transmits the re-encoded signal. The encoding applied by the cooperating mobile device 14 should be the same as the original encoding applied by either the serving base station 12 or primary mobile device 14. In other embodiments, the cooperating mobile device 14 may function as a repeater. In this case, the signals received by the cooperating mobile device 14 are simply repeated without any decoding.

In some embodiments, the cooperating mobile device 14 may wait for a NACK from the receiving node before retransmitting as shown in FIGS. 2 and 4. The original transmission from the sending node (primary mobile device 14 or serving base station 12) to the receiving node (serving base station 12 or primary mobile device 14) may take place in a first iteration of a HARQ process. The retransmission may take place in a second or subsequent HARQ iteration. In other embodiments, the cooperating mobile device 14 may retransmit the signal received from the sending node immediately without waiting for a NACK. In this case, the retransmission may occur in the same iteration of the HARQ process as the original transmission from the sending node.

Figure 7:
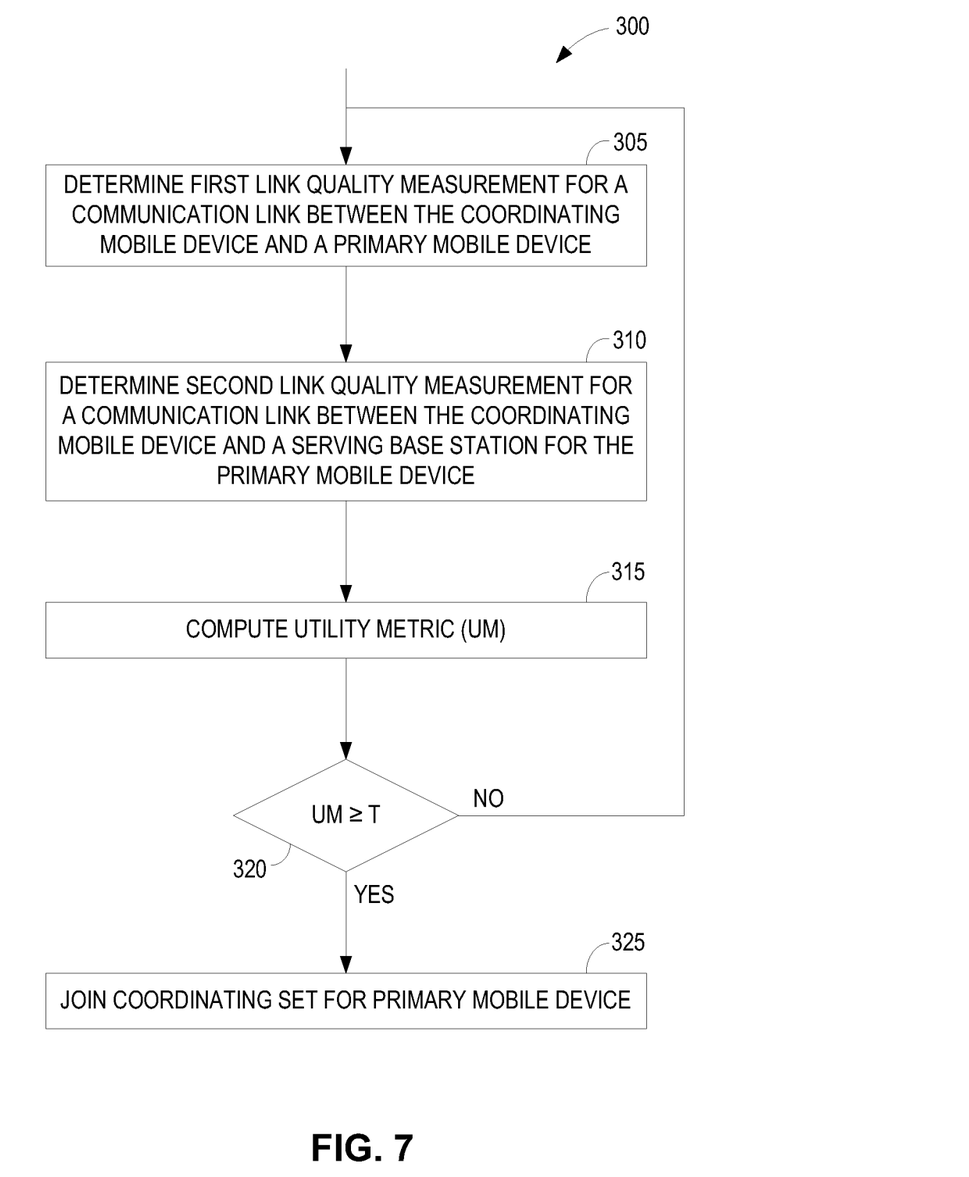
FIG. 7 illustrates an exemplary method implemented by a base station for selecting one or more cooperating devices for a coordinating set for a primary mobile device.

FIG. 7 illustrates an exemplary method 300 implemented by a cooperating mobile device 14 for joining the cooperating set of a primary mobile device 14. The cooperating mobile device 14 determines a first link quality measurement for a communication link between the cooperating mobile device 14 and the primary mobile device 14 (block 305). The cooperating mobile device 14 also determines a second link quality measurement for a communication link between the cooperating mobile device 14 and a serving base station 12 for the primary mobile device 14 (block 310). The cooperating mobile device 14 then computes a utility metric (UM) based on the first and second link quality measurements (block 315). The cooperating mobile device 14 compares the utility metric to a threshold (block 320). If the utility metric is greater than or equal to the threshold, the cooperating mobile device 14 joins the coordinating set for the primary mobile device 14 (block 325). Otherwise, the cooperating mobile device 14 continues monitoring the first and second communication links.

In one exemplary embodiment, the utility metric can be based on the signal-to-interference-plus-noise ratio (SINR) of the signal from the primary mobile device 14 to the cooperating mobile device 14, and the SINR of the signal from the cooperating mobile device 14 to the serving base station 12 for the primary mobile device 14. In some embodiments, the cooperating mobile device 14 may compare the SINR for each communication link to the threshold and join the coordinating set if both SINR measurements meet or exceed the threshold. In other embodiments, the SINR measurements for the two communication links may be weighted and combined. In this case, the cooperating mobile device 14 joins the coordinating set for the primary mobile device 14 if the combined utility metric meets the threshold.

In some embodiments, the utility metric may incorporate factors in addition to the SINR measurements of the communication links. As one example, the utility metric may take into account the additional interference that is attributable to the retransmission by the cooperating mobile device 14. More particularly, the cooperating mobile device 14 may determine a signal-to-leakage noise ratio (SLNR) due to its retransmission. The SLNR measurement may be combined with the SINR measurements to compute the utility metric.

Figure 8:
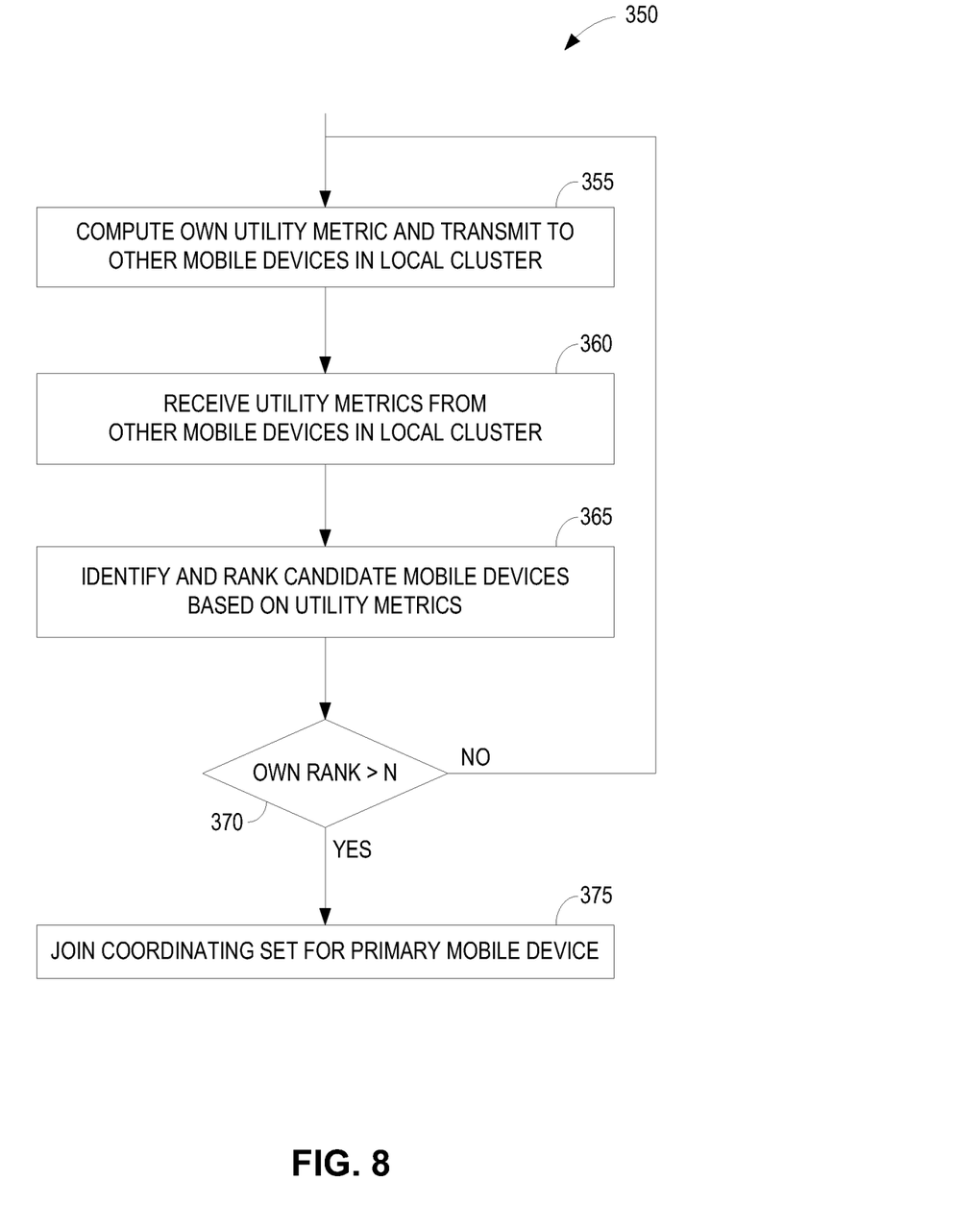
FIG. 8 illustrates an exemplary method implemented by a cooperating mobile device for joining a coordinating set for a primary mobile device.

FIG. 8 illustrates another exemplary method 350 implemented by a cooperating mobile device 14 for selectively joining the coordinating set of a primary mobile device 14 in the same local cluster 18. In this case, the selection is carried out among a plurality of mobile devices 14 in a distributed and coordinated fashion. Each cooperating mobile device 14 in a local cluster 18 computes its own utility metric and, if the metric passes a threshold, transmits its utility metric to other mobile devices 14 in the local cluster 18 (block 355). The other mobile devices 14 in the local cluster 18 do the same. Thus, the cooperating mobile device 14 may receive utility metrics from other candidate mobile devices 14 (block 360).

The mobile devices 14 within a local cluster 18 whose utility metric meets the threshold requirement define a candidate set. The cooperating mobile device 14 identifies and ranks the mobile devices 14 in the candidate set based on the utility metrics of the mobile devices 14 (block 365). The cooperating mobile device 14 then compares its rank to a predetermined number n, which represents the number of mobile devices in a coordinating set (block 370). If the rank of the cooperating mobile device 14 is higher (>) than n, the cooperating mobile device 14 joins the coordinating set for the primary mobile device 14 (block 375).

The coordinated selection approach shown in FIG. 8 enables each of the mobile devices 14 to independently determine the coordinating set for any primary mobile device 14. To minimize signaling between the mobile devices 14, the utility metrics are transmitted only when the utility metrics exceed the threshold.

It will be appreciated that a given mobile device 14 in a local cluster 18 may serve as a cooperating mobile device 14 for more than one other mobile device 14. In this case, the mobile device 14 computes a utility metric for each other mobile device 14 in the local cluster 18. As noted above, the mobile devices 14 in the local cluster exchange the utility metrics. A given mobile device 14 may then join the coordinating set for one or more other mobile devices 14 in the local cluster 18, depending on its ranking. In some embodiments, a limit may be imposed on the number of coordinating sets to which a given mobile device 14 may join to prevent overloading of a single mobile device 14.

Figure 9:
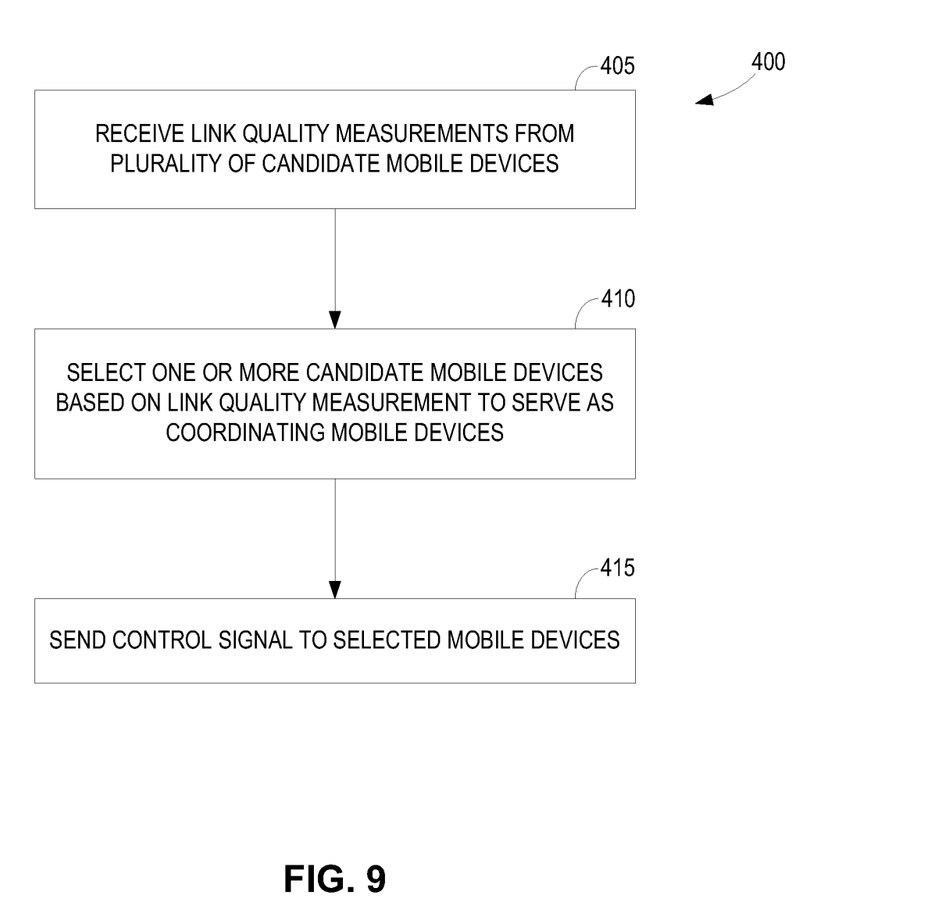
FIG. 9 illustrates another exemplary method implemented by a cooperating mobile device for joining a coordinating set for a primary mobile device.

In some embodiments of the invention, the members of the coordinating set for a given mobile device 14 may be determined by its serving base station 12. FIG. 9 illustrates an exemplary method 400 implemented by a serving base station 12 for determining the coordinating set of a primary mobile device 14 that is served by the base station 12. In this method, the base station receives link quality measurements from a plurality of candidate mobile devices 14 in the local cluster 18 of the primary mobile device 14 (block 405). Alternatively, the serving base station 12 may receive utility metrics from each of the candidate mobile devices. Base stations 20 receiving link quality metrics or utility metrics from candidate mobile devices 14 may also exchange the received metrics with other coordinating base stations 20. Based on the link quality measurements or utility metrics, the serving base station 12 selects one or more candidate mobile devices 14 to serve as cooperating mobile devices 14 (block 410). After selecting the members of the coordinating set, the base station sends a control signal to the selected mobile devices 14 to request that the selected mobile devices 14 join the candidate set for a designated mobile device 14 (block 415). The identity of the supported mobile device 14 is included in the request.

In some embodiments of the invention, the base station 12 may use its knowledge of the coordinating set for a designated mobile device 14 to adapt the modulation and coding scheme (MCS) of the mobile device 14 to a more spectrally efficient value. Typically, the MCS of a given mobile device 14 is chosen to achieve a 90% probability of successful decoding on the first transmission, which equates to a 10% bit error rate (BER). More aggressive link adaptation implementations may target a 20% or 30% bit error rate. As known in the art, if the initial transmission is not successful, the base station 12 can request retransmission by sending a NACK. When one or more cooperating mobile devices 14 are available for retransmitting the uplink signal, the probability of successful decoding will increase. Therefore, the base station 12 can select a higher MCS value for the mobile device 14 when one or more cooperating mobile devices 14 are present. In this case, the MCS for the supported mobile device 14 may be chosen to achieve a 90% probability of successful decoding based on the combined signals. This approach will result in a higher throughput and overall improvement in spectral efficiency. In some embodiments, the adaptation of the MCS may be used for the initial transmission, i.e., the first HARQ iteration. In other embodiments, the MCS may be adapted in the second or subsequent HARQ iterations. The selection of the MCS can be communicated by messaging between the primary mobile device 14 and the cooperating mobile devices 14.

In some embodiments, the coordinating set for a primary mobile device 14 may include one or more cooperating base stations 12 other than the serving base station 12 and the one or more cooperating mobile devices 14. The members of the coordinating set are referred to generically as cooperating nodes. For example, the coordinating set for a primary mobile device 14 may include the serving base station 12, at least one cooperating base station 12, and at least one cooperating mobile device 14. As an example, the coordinating set for UE1 in FIG. 1 may include BS1 (the serving base station 12), BS2 (the cooperating base station 12), and UE2 (the cooperating mobile device 14). BS2 may send the signals received from UE1 over a backhaul link to BS1, while UE2 retransmits the signal received from UE1 over a wireless link to BS1. BS1 may then combine the signals received from BS2 and UE2 with the signal received directly from UE1.

Figure 10:
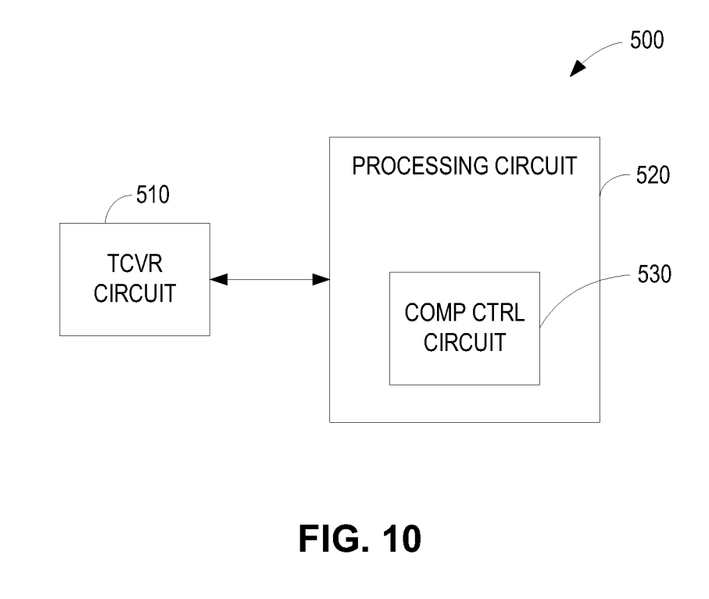
FIG. 10 illustrates the main functional components of communication device implementing coordinated multipoint transmission and reception.

FIG. 10 illustrates a wireless communication device 500 which may be used to implement the various methods herein described. The communication device 500 comprises a transceiver circuit 510 and a processing circuit 520. The transceiver circuit 510 may operate according to any known wireless communication standard, such as the Long Term Evolution (LTE) standard or WiFi standard. The processing circuit 520 processes the signals transmitted and received by the transceiver circuit 510. The processing circuit 520 may comprise one or more processors, microcontrollers, hardware, firmware, or a combination thereof. The processing circuit includes a CoMP control circuit 530 for implementing the methods and techniques herein described.

Embodiments of the invention as herein described improve the individual and aggregate throughput in a wireless communication system by exploiting idle mobile devices 14 to retransmit signals received from other active mobile devices 14. In addition to improving capacity and throughput, the techniques herein described will also help in eliminating coverage holes for mobile devices in poor coverage areas. In some embodiments, the bandwidth requirements for the backhaul links between the base stations, and the processing loads of the base stations, may be reduced.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method implemented by a cooperating mobile device in a wireless communication network for supporting coordinated multipoint transmission and reception for a primary mobile device, said method comprising:
   obtaining a first link quality for a first communication link between the primary and cooperating mobile device and a second link quality for a second communication link between the cooperating mobile device and a serving base station;
   selectively joining, by said cooperating mobile device, a coordinating set for the primary mobile device based on the first and second link qualities, said coordinating set including the serving base station for the primary mobile device and at least one cooperating base station in the wireless communication network, the serving base station and the at least one cooperating base station being different base stations;
   receiving, by the cooperating mobile device as a member of said coordinating set, a data signal transmitted from one of the primary mobile device and the serving base station to the other using a single radio access technology; and
   retransmitting, by the cooperating mobile device as the member of said coordinating set, the data signal to the other of the serving base station and the primary mobile device using the single radio access technology.

2. The method of claim 1, wherein joining the coordinating set for the primary mobile device comprises:
   receiving a control signal from the serving base station in the wireless communication network indicating that the cooperating mobile device is selected as a cooperating mobile device for the primary mobile device; and
   joining the coordinating set for the primary mobile device responsive to the control signal.

3. The method of claim 1, wherein selectively joining the coordinating set for the primary mobile device comprises:
   determining a utility metric for the cooperating mobile device based on the first and second link qualities; and
   selectively joining the coordinating set for the primary mobile device based on the utility metric.

4. The method of claim 3, wherein determining the utility metric for the cooperating mobile device comprises:
   determining a link quality metric for the cooperating mobile device; and computing the utility metric as a function of the link quality metric.

5. The method of claim 4, wherein said obtaining the first and second link qualities comprises:
measuring the first link quality for a first communication link between the cooperating mobile device and the primary mobile device to obtain a first link quality measurement; and
measuring the second link quality for a second communication link between the cooperating mobile device and the serving base station for the primary mobile device to obtain a second link quality measurement; and
wherein said determining the link quality metric for the cooperating mobile device comprises:
computing the link quality metric for the cooperating mobile device based on the first and second link quality measurements.

6. The method of claim 4 wherein:
determining the utility metric for the cooperating mobile device further comprises determining an interference metric for the cooperating mobile device; and
computing the utility metric for the cooperating mobile device is further based on the interference metric.

7. The method of claim 3 wherein selectively joining the coordinating set for the primary mobile device based on the utility metric comprises joining the coordinating set if the utility metric meets a utility threshold.

8. The method of claim 3 wherein selectively joining the coordinating set for the primary mobile device based on the utility metric comprises:
determining a candidate set comprising the cooperating mobile device and one or more other candidate mobile devices;
receiving or determining a utility metric for each of the candidate mobile devices including the cooperating mobile device; and
selectively joining the coordinating set for the primary mobile device based on a comparison of the utility metric for the cooperating mobile device with the utility metrics of the one or more other candidate mobile devices.

9. The method of claim 8, wherein selectively joining the coordinating set for the primary mobile device based on the comparison of the utility metric for the cooperating mobile device with the utility metrics of the one or more other candidate mobile devices comprises:
ranking the one or more other candidate mobile devices based on their utility metrics; and
joining the coordinating set if the utility metric for the cooperating mobile device is among a predetermined number of the highest ranked candidate mobile devices in the coordinating set.

10. The method of claim 1 wherein retransmitting the data signal to the other of the serving base station and primary mobile device comprises:
receiving an acknowledgement signal indicating that the data signal transmitted between the primary mobile device and the serving base station was not correctly received; and
retransmitting the data signal responsive to the acknowledgement signal.

11. The method of claim 1 wherein the coordinating set includes at least one non-serving base station.

12. The method of claim 1, wherein the retransmitting is performed in cooperation with the cooperating base station transmitting or receiving the data signal.

13. The method of claim 1, wherein joining the coordinating set for the primary mobile device comprises:
determining a utility metric for each mobile device in a candidate set, wherein the candidate set includes the cooperating mobile device and one or more other candidate mobile devices;
determining a rank of the cooperating mobile device in the candidate set based on the utility metric for each mobile device in the candidate set; and
in response to the rank of the cooperating mobile device being greater than a predetermined threshold, joining the coordinating set for the primary mobile device.

14. The method of claim 13, wherein the predetermined threshold is a number of mobile devices in the coordinating set.

15. The method of claim 1, wherein said retransmitting uses a certain modulation coding scheme that is adapted based on a number of cooperating mobile devices in the coordinating set that are used for the coordinated multipoint transmission and reception.

16. The method of claim 1, wherein said retransmitting uses a certain modulation coding scheme that is adapted based on a probability of successful decoding of a combined signal that includes the transmitted and retransmitted data signals received at the other of the serving base station and the primary mobile device.

17. The method of claim 1, wherein the transmitted and retransmitted data signals are associated with different modulation coding schemes.

18. The method of claim 1, wherein said selectively joining includes joining if each of the first and second link qualities exceed respective first and second thresholds.

19. The method of claim 18, wherein the first and second thresholds are different.

20. The method of claim 1, wherein said selective joining includes autonomously joining the coordinating set for the primary mobile device based on the first and second link qualities.

21. A cooperating mobile device in a wireless communication network for supporting coordinated multipoint transmission and reception for a primary mobile device, said cooperating mobile device comprising:
a transceiver circuit configured to transmit and receive signals over a wireless communication channel; and
a processing circuit including a coordinated multipoint control circuit and configured to:
obtaining a first link quality for a first communication link between the primary and cooperating mobile device and a second link quality for a second communication link between the cooperating mobile device and a serving base station;
selectively join a coordinating set for the primary mobile device based on the first and second link qualities, said coordinating set including the serving base station for the primary mobile device and at least one cooperating base station in the wireless communication network, the serving base station and the at least one cooperating base station being different base stations;
receive, as a member of the coordinating set for the primary mobile device, a data signal transmitted from one of the primary mobile device and the serving base station to the other using a single radio access technology; and
retransmit, as the member of the coordinating set for the primary mobile device, the data signal to the other of the serving base station and the primary mobile device using the single radio access technology.

22. The cooperating mobile device of claim 21, wherein the processing circuit is configured to selectively join the coordinating set for the primary mobile device by:
  receiving a control signal from the serving base station in the wireless-communication network indicating that the cooperating mobile device is selected as a cooperating mobile device for the primary mobile device; and
  selectively joining the coordinating set for the primary mobile device responsive to the control signal.

23. The cooperating mobile device of claim 21 wherein the processing circuit is configured to selectively join the coordinating set for the primary mobile device by:
  determining a utility metric for the cooperating mobile device based on the first and second link qualities; and
  selectively joining the coordinating set for the primary mobile device based on the utility metric.

24. The cooperating mobile device of claim 23 wherein the processing circuit is configured to determine the utility metric for the cooperating mobile device by:
  determining a link quality metric for the cooperating mobile device; and
  computing the utility metric as a function of the link quality metric.

25. The cooperating mobile device of claim 24, wherein the processing circuit is configured to obtain the first and second link qualities by:
  measuring the first link quality for a first communication link between the cooperating mobile device and the primary mobile device to obtain a first link quality measurement; and
  measuring the second link quality for a second communication link between the cooperating mobile device and the serving base station for the primary mobile device to obtain a second link quality measurement; and
  wherein the processing circuit is configured to determine the link quality metric for the cooperating mobile device by:
    computing the link quality metric for the cooperating mobile device based on the first and second link quality measurements.

26. The cooperating mobile device of claim 24 wherein the processing circuit is configured to:
  determine the utility metric for the cooperating mobile device further by determining an interference metric for the cooperating mobile device; and
  compute the utility metric for the cooperating mobile device further based on the interference metric.

27. The cooperating mobile device of claim 23 wherein the processing circuit is configured to selectively join the coordinating set for the primary mobile device based on the utility metric by joining the coordinating set if the utility metric meets a utility threshold.

28. The cooperating mobile device of claim 23 wherein the processing circuit is configured to selectively join the coordinating set for the primary mobile device based on the utility metric by:
  determining a candidate set comprising the cooperating mobile device and one or more other candidate mobile devices;
  receiving or determining a utility metric for each of the candidate mobile devices including the cooperating mobile device; and
  selectively joining the coordinating set for the primary mobile device based on a comparison of the utility metric for the cooperating mobile device with the utility metrics of the one or more other candidate mobile devices.

29. The cooperating mobile device of claim 28 wherein the processing circuit is configured to selectively join the coordinating set for the primary mobile device based on the comparison of the utility metric for the cooperating mobile device with the utility metrics of the one or more other candidate mobile devices by:
  ranking the one or more candidate mobile devices based on the utility metrics; and
  joining the coordinating set if the utility metric for the cooperating mobile device is among a predetermined number of the highest ranked candidate mobile devices in the coordinating set.

30. The cooperating mobile device of claim 21 wherein the processing circuit is configured to retransmit the data signal to the other of the serving base station and primary mobile device by:
  receiving an acknowledgement signal indicating that the data signal transmitted between the primary mobile device and the serving base station was not correctly received; and
  retransmitting the data signal responsive to the acknowledgement signal.

31. The cooperating mobile device of claim 21 wherein the coordinating set includes at least one non-serving base station.

32. The cooperating mobile device of claim 21, wherein the retransmitting is performed in cooperation with the cooperating base station transmitting or receiving the data signal.

* * * * *